US008636156B2

(12) United States Patent
Malik (10) Patent No.: US 8,636,156 B2
(45) Date of Patent: Jan. 28, 2014

(54) RECONFIGURABLE, EXPANDABLE OVER DOOR RACK

(76) Inventor: Vijay S. Malik, Kansas City, MO (US)

(*) Notice: Subject to any disclaimer, the term of this patent is extended or adjusted under 35 U.S.C. 154(b) by 141 days.

(21) Appl. No.: 13/301,728

(22) Filed: Nov. 21, 2011

(65) Prior Publication Data

US 2013/0220957 A1     Aug. 29, 2013

Related U.S. Application Data

(63) Continuation-in-part of application No. 29/374,131, filed on Jul. 6, 2011, now Pat. No. Des. 649,819.

(51) Int. Cl.
*A47G 29/087* (2006.01)
*A47F 5/08* (2006.01)
*A47F 5/01* (2006.01)
*A47F 5/13* (2006.01)
*A47G 29/08* (2006.01)

(52) U.S. Cl.
USPC .............. 211/119.004; 211/90.02; 211/90.03; 211/96; 211/116; 211/106

(58) Field of Classification Search
USPC ........... 211/150, 116, 113, 119.009, 119.004, 211/35, 36, 90.01–90.04, 87.01, 103, 106, 211/106.01, 96, 187, 190, 207; 248/214, 248/300, 309.2; D6/409–415, 449, D6/455–458, 461–462, 464–468, 474, D6/476–479, 407, 630, 512–514, 570, 315, D6/566
See application file for complete search history.

(56) References Cited

U.S. PATENT DOCUMENTS

| | | | |
|---|---|---|---|
| 1,039,694 A | 10/1912 | Burton | |
| 1,401,356 A | 12/1921 | Parchert | |
| 2,845,182 A * | 7/1958 | Atkinson | 211/37 |
| 2,925,916 A * | 2/1960 | Pollock | 211/119.004 |
| 3,198,343 A * | 8/1965 | Pollock | 211/87.01 |
| 3,913,745 A * | 10/1975 | Weiss | 211/34 |
| 3,918,670 A * | 11/1975 | Doherty | 248/214 |
| D287,550 S * | 1/1987 | Tocci | D6/320 |
| 4,688,681 A | 8/1987 | Bergeron | |
| D381,225 S * | 7/1997 | Malik | D6/513 |
| D393,970 S | 5/1998 | Lee | |
| 5,749,480 A * | 5/1998 | Wood | 211/169.1 |
| 5,855,279 A * | 1/1999 | Klein et al. | 211/35 |
| D407,908 S * | 4/1999 | Dickinson et al. | D6/320 |
| 5,894,940 A * | 4/1999 | Gusdorf et al. | 211/35 |
| 5,988,409 A * | 11/1999 | Gusdorf et al. | 211/90.01 |
| D463,182 S * | 9/2002 | Klein et al. | D6/514 |
| 6,464,087 B1 * | 10/2002 | Klein et al. | 211/35 |
| D493,289 S | 7/2004 | Klein et al. | |
| D501,106 S * | 1/2005 | Suero, Jr. | D6/514 |
| 6,902,071 B2 * | 6/2005 | Vitale | 211/40 |
| D525,062 S | 7/2006 | Abdi et al. | |

(Continued)

*Primary Examiner* — Jennifer E Novosad
(74) *Attorney, Agent, or Firm* — Richard L. Marsh (57) ABSTRACT

A rack for storing objects on a door has at least two uprights, at least two hanging brackets, a plurality of shelf supports, a plurality of shelves and at least two hanging links. The uprights are spaced apart a distance equal to a length of the shelves and spaced from the door by ends of the uprights angled toward the door. The shelves may be disposed at an angle relative to a vertical position of the uprights wherein a superior mounted pair of uprights has hanging links depending from a lower support end and the hanging links are engaged upon an upper support end of another pair of uprights.

1 Claim, 7 Drawing Sheets

(56) References Cited

U.S. PATENT DOCUMENTS

| | | |
|---|---|---|
| 7,249,680 B2 * | 7/2007 | Wang .............................. 211/37 |
| D598,218 S | 8/2009 | Siegel |
| 7,762,406 B2 * | 7/2010 | Qiang ............................. 211/38 |
| D649,819 S * | 12/2011 | Malik ............................. D6/513 |
| 2003/0085188 A1 * | 5/2003 | Klein et al. .................... 211/118 |
| 2004/0007549 A1 * | 1/2004 | Klein et al. .................... 211/118 |
| 2004/0118791 A1 * | 6/2004 | Rimback et al. ................ 211/34 |
| 2004/0159619 A1 * | 8/2004 | Klein et al. ..................... 211/35 |
| 2010/0270246 A1 * | 10/2010 | Rodriguez ....................... 211/34 |

* cited by examiner

RECONFIGURABLE, EXPANDABLE OVER DOOR RACK

RELATED APPLICATION DATA

This application is a non-provisional continuation-in-part application of Applicant's Ser. No. 29/374,131 filed Jul. 6, 2011, now allowed and Applicant claims the priority established with the filing thereof. The entire specification of Applicant's design application is incorporated into this application by this reference thereto

BACKGROUND OF THE INVENTION

1. Field of the Invention

This invention relates to rack that hangs over a top edge of a household door or mounted to a vertical surface wherein the shelving on the rack may be canted in at least two angles relative to standards of the rack and wherein at least another rack may be loosely suspended from a rack hung in a superior position.

2. Prior Art Statement

It is known to provide a shoe rack which hangs over a top edge of a household door support with fixed angled rod supports wherein the rod supports are disposed in a single forward downwardly sloping angle. For instance, see U.S. Design Pat. D 493,289 S issued on 27 Jul. 2004 to Klein, et al. Despite the forward downwardly sloping angle of the rod supports, the shoes are actually disposed in a rearward downward slope. Only one configuration of shelving is available with this shoe rack and therefore, there is a need for an over door rack that has repositionable shelving which allows both front and rear facing storage and may be expanded by supporting a second rack on a bottom end treatment of an identical rack in a superior position.

It is also known to provide an over door shoe rack with fixed angled rod supports disposed in a forward upwardly sloping angle wherein a second shoe rack may be rigidly affixed to a shoe rack in a superior position. For instance see the U.S. Design Pat. D 381,225 issued on 22 Jul. 1997 to Vijay S. Malik. Despite the forward upwardly sloping angle of the rod supports, the shoes are actually disposed in a rearward downward slope. The top of the second shoe rack has protruding buttons in a recessed area of each vertical frame element that are rigidly affixed to keyhole apertures in a bottom portion of each vertical frame element of the first shoe rack. Additionally, the shelving units are integrally molded to the vertical frame elements and are therefore affixed at a specified angle relative to the vertical frame elements. Therefore, there exists a great need for a rack for storing objects on a door comprising at least two uprights, at least two hanging brackets, a plurality of shelf supports and a plurality of shelves wherein the uprights are spaced apart a distance equal to a length of the shelves, the uprights are spaced from the door by ends of the uprights angled toward the door and the shelves are reversible upon the shelf supports.

It is further known to provide an over door shoe rack comprising a plurality of shoe support rods disposed in fixed relationship on spaced apart portions of upright supports. For instance, see U.S. Design Pat. D 525,062 S issued on 18 Jul. 2006 to Abdi, et al. The rods are fixed in the upright supports such that shoes may be only disposed in an upwardly forward attitude. Thus, the need still exists for an over door rack that provides for differently disposed attitudes for the objects stored or displayed on the door.

Furthermore, it is known to provide an over door shoe rack comprising a plurality of wire loops affixed to horizontal bars wherein each horizontal bar has two wire loops at each of multiple locations across the length thereof wherein the two wire loops at each location are disposed at different upward forward attitudes. For instance, see the U.S. Design Pat. D 463,182 S issued on 24 Sep. 2002 to Klein, et al. As the wire loops are fixed in the specific upwardly forward attitudes, shoes may only be suspended on the ends of the loops in the same attitude. Therefore, there is still a great need for an over door rack that provides for reconfigurable shelving for displaying and/or storing objects in either an upwardly forward attitude or a downwardly forward attitude.

Additionally, it is known to provide a shoe rack or foot apparel storage assembly wherein shelves or shelf supports are disposed in an upwardly forward attitude when deployed for use but are rotatable to a position substantially parallel to the base support when not in use. For instance, see the U.S. Design Pat. D 598,218 S issued on 18 Aug. 2009 to Ken Siegel or the U.S. Pat. No. 4,688,681 issued on 25 Aug. 1987 to Paul U. Bergeron. In both patents, the shelves or shelf supports are prevented from assuming a downwardly sloping attitude by the construction thereof and more specifically by the portion of the shelf or shelf support adjacent the upright support. Accordingly, there is still a need for an over door rack that provides for different forward facing sloping for the shelves.

Likewise, it is known to provide a shoe rack for production of shoes wherein shelves are formed by connecting inclined end members by means of bars or dowels spaced at desired distances and wherein the inclined members are sloped upwardly but in opposite directions on opposite sides of the shoe rack. End bars prevent the shoes from sliding off the ends of the shelves. For instance, see the U.S. Pat. No. 1,401,356 issued on 27 Dec. 1921 to Frederick L. Parchert. Since the shelves are disposed on opposite sides of the shoe rack, those on the back side are not accessible without turning the shoe rack around 180 degrees and thus the shoe rack of this invention is not suitable for storage and display of shoes on a back side of a door even if made of lighter and smaller materials. Therefore, the need is great for an over door rack that can have all shelves sloped in an upwardly forward or downwardly forward attitude or may have different shelves disposed in opposite attitudes.

Also known in the art are Printer's Collapsible Stationery Drying Frames as described in the U.S. Pat. No. 1,039,694 issued on 1 Oct. 1912 to John C. Burton. The drying frame comprises sidebars connected at the upper and lower ends thereof by transverse bars. Between the sidebars are shelves of wire material that pivot on rods secured in the sidebars. The shelves have eye loops supported on the rods and further have a support brace with a terminal hook for holding the shelves in the desired substantially horizontal attitude. The shelves collapse downwardly upon removal of the hook from the next lower rod. Though the shelves could be supported in any attitude by merely changing the length of the support brace, the inventor of this patent does not so teach. Additionally, the shelves are pivotally supported on one end. Thus the need for an over door rack that has shelves supported substantially at a mid point thereof that may be disposed in an upwardly forward attitude or a downwardly forward attitude still exists.

Finally, it is known to provide a door-mounted cap rack that has two uprights, two hanging brackets, a plurality of cap support rods and a plurality of cap supports wherein the uprights are spaced from the door by ends of the uprights angled toward the door and the cap supports are disposed in a vertical attitude with respect to the cap support rods. For instance, see the U.S. Design Pat. D 393,970 issued on 5 May 1998 to James Lee. The cap supports are fixed in position relative to the cap support rods and the cap support rods are fixed in position relative to the uprights and thus the attitude of the cap support is fixed. Therefore, the need for an over door rack having reconfigurable shelves is great.

SUMMARY OF THE INVENTION

One object of this invention is to provide an over door rack comprising at least two uprights, at least two hanging brackets, a plurality of shelf supports, a plurality of shelves with the uprights spaced apart a distance equal to a length of the shelves and the uprights spaced from the door by ends of the uprights angled toward the door wherein said shelves are pivotable upon the shelf supports.

Another object of this invention is to provide a rack for storing objects on a door that comprises at least two uprights, at least two hanging brackets, a plurality of shelf supports, a plurality of shelves wherein the uprights are spaced apart a distance equal to a length of the shelves and are spaced from the door by ends of the uprights angled toward the door and wherein the shelves are disposed at an angle relative to a vertical position of the uprights.

A primary goal of this invention is to provide a rack for storing objects on a door that comprises at least two uprights, at least two hanging brackets, a plurality of shelf supports, a plurality of shelves wherein the shelves are formed into a wire frame selected from a group consisting of rectangular, curved, angled, rectangular with at least one end upwardly turned, cross brace or combinations thereof.

A significant feature of this invention is to provide a rack for storing objects on a door that comprises at least two uprights, at least two hanging brackets, a plurality of shelf supports, a plurality of shelves, the uprights spaced apart a distance approximately equal to a length of the shelves, the uprights spaced from the door by ends of the uprights angled toward the door wherein the shelves are pivotable upon the shelf supports and wherein the uprights have apertures disposed into a peripheral wall thereof.

A main purpose of this invention is to provide a rack for storing objects on a door that comprises at least two uprights, at least two hanging brackets, a plurality of shelf supports, a plurality of shelves, the uprights spaced apart a distance approximately equal to a length of the shelves, the uprights spaced from the door by ends of the uprights angled toward the door wherein the shelves are pivotable upon the shelf supports, the uprights having apertures disposed into a peripheral wall thereof and wherein the apertures are arranged in pairs along the uprights.

A primary principle of this invention is to provide a rack for storing objects on a door that comprises at least two uprights, at least two hanging brackets, a plurality of shelf supports, a plurality of shelves wherein the uprights are spaced apart a distance equal to a length of the shelves and are spaced from the door by ends of the uprights angled toward the door and wherein the shelves are disposed at an angle relative to a vertical position of the uprights wherein apertures are provided through peripheral walls of the uprights, the apertures receiving shelf supports therein and wherein the shelf supports receive a portion of the wire loop of the shelves therein.

A principal aim of this invention is to provide a rack for storing objects on a door that comprises at least two uprights, at least two hanging brackets, a plurality of shelf supports, a plurality of shelves, the uprights spaced apart a distance approximately equal to a length of the shelves, the uprights spaced from the door by ends of the uprights angled toward the door wherein the shelves are pivotable upon the shelf supports, the uprights having apertures disposed into a peripheral wall thereof and wherein the apertures are arranged in pairs along the uprights wherein the shelf supports comprise a generally "U" shaped wire loop wherein open ends of the "U" shaped wire loop are disposed through preformed holes in an polymeric retainer, the polymeric retainer disposed through adjacent apertures.

DESCRIPTION OF THE PREFERRED EMBODIMENTS

Figure 1:
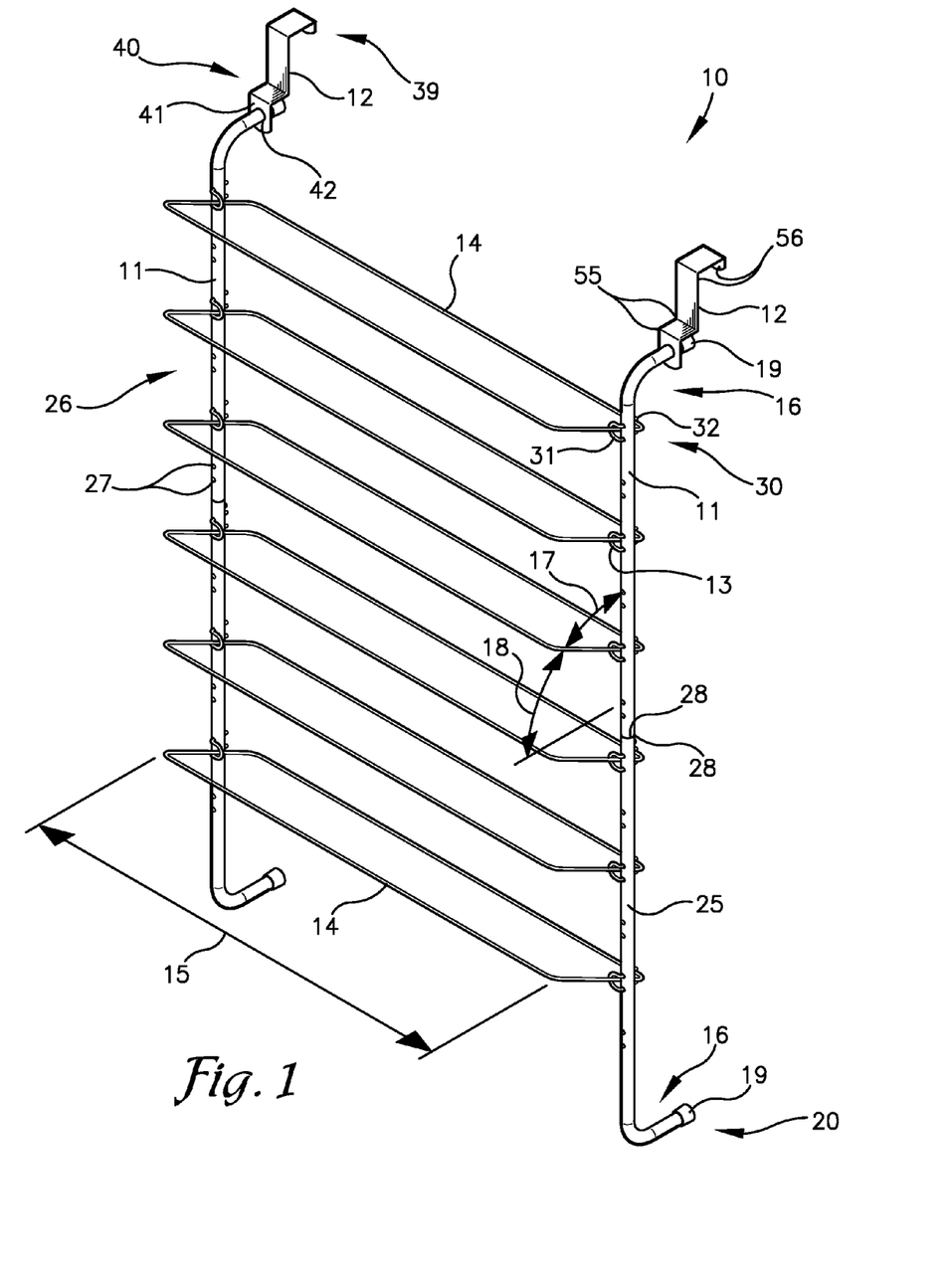
FIG. 1 is a perspective view of the reconfigurable over door rack of this invention showing the shelves in a forward upwardly facing attitude.

Referring now to FIG. 1, a reconfigurable over door rack for storing objects on a door is generally shown by the number 10. Reconfigurable over door rack 10 comprises at least two uprights 11, at least two hanging brackets 12, a plurality of shelf supports 13, and a plurality of shelves 14. Uprights 11 are spaced apart a distance substantially equal to a length 15 of shelves 14 wherein uprights 11 are spaced from a door upon which over door rack 10 is suspended by ends 16 of uprights 11 angled toward the door. Shelves 14 are pivotable upon shelf supports 13 and thus may be canted within a range of angles 17 relative to uprights 11. While still referring to FIG. 1, it is readily observed that shelves 14 are pivoted upwardly at angle 18 of up to 45 degrees from the horizontal. Shelves 14 remain at angle 18 of rotation by the weight of objects stored thereupon and thus angle 17 to uprights 11 is from about 90 degrees to 45 degrees relative thereto. Now also referring to FIG. 2, it can also be observed that shelves 14 may be pivoted downwardly at angle 18 of up to 60 degrees from the horizontal wherein again shelves 14 will remain at the set angle 18 by the weight of objects thereupon and therefore complementary angle 17 relative to uprights 11 is from about 90 degrees to 30 degrees.

Though over door rack 10 is commonly called an over door shoe rack, it is readily apparent that other objects may be stored upon shelves 14 of over door rack 10. For instance, boxes will remain upon shelves 14 at the angle 17 commensurate with the total weight of the boxes and combined center of gravity thereof. Additionally, a combination of objects may be stored upon a single shelf 14 and shelf 14 will remain at the angle 17 commensurate with the combined center of gravity of all the objects stored upon each shelf 14. Since the center of gravity of all objects on each shelf 14 will determine the angular position of shelf 14 relative to uprights 11, angle 17 of each of shelves 14 may be adjusted by shifting some objects thereupon forward or backward upon shelf 14. By appropriately shifting objects upon shelves 14, all shelves 14 may be substantially parallel or may be canted at different angles 17 to optimize all storage space upon over door rack 10. Additionally, objects stored on shelves 14 may also come in contact with the surface of the door which will of necessity determine angle 17 with respect to uprights 11. As will be fully explained hereinafter, shelves 14 may also be positioned at different locations upon uprights 11 thus providing for greater optimization of storage space.

Figure 4:
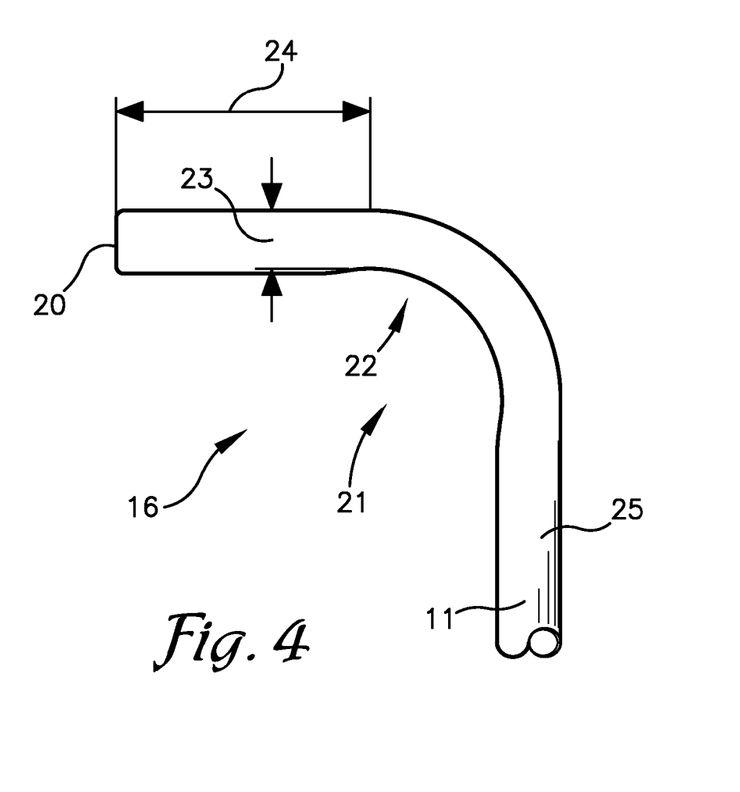
FIG. 4 is an enlarged view of the preferred end treatment of the uprights of the reconfigurable over door rack of FIGS. 1 and 2.
Figure 5:
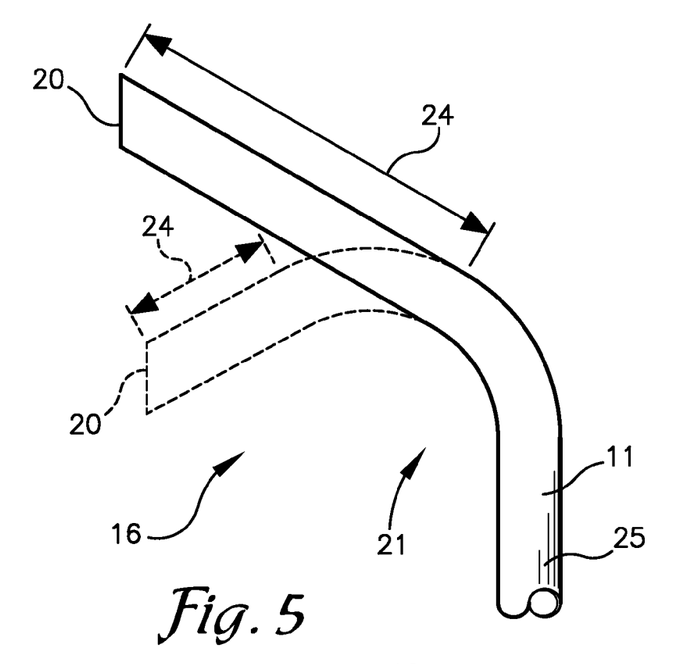
FIG. 5 is enlarged view of alternate end treatments of the uprights of the reconfigurable over door rack of FIGS. 1 and 2.

Uprights 11 are preferably round steel hollow tubes, however it should be understood that uprights 11 may be formed from a variety of solid or tubular materials selected from the group consisting of steel, brass, copper, aluminum, polymeric material, wood or combinations thereof as well as in any suitable cross sectional shape selected from the group consisting of round, oval, figure eight, rectangular, triangular or combinations thereof. In the preferred embodiment of FIGS. 1 and 2, uprights 11 are provided with ends 16 formed at approximately 90 degrees to the elongated length thereof, ends 16 capped with polymeric caps 19 on the terminal ends 20 thereof, caps 19 adapted to preserve the finish upon the door while also limiting movement of over door rack 10 upon the door when the door is moved. Referring also now to FIG. 4, the preferred end 16 is a 90 degree bend 21 in the hollow tube forming uprights 11, bending of bend 21 slightly reducing the size 23 of the hollow tube in the bight 22 thereof, this reduction in size 23 in bight 22 performing a further function to be hereinafter fully explained. A free length 24 of end 16 is defined to be a distance from terminal end 20 thereof to the beginning of bend 21 and may be from about 2 to about 6 inches. Bend 21 is from about 1 to about 3 inches in radius and most preferably is about one and one half inches. Of course it is possible within the scope of this invention to form bend 21 at an angle slightly greater or lesser than 90 degrees and it is also within the scope of this invention to provide for other shapes for ends 16 as well as provide for different shapes on the opposed ends of each of uprights 11. For instance, referring also now to FIG. 5, end 16 may be sloped at a greater or lesser angle with respect to a straight portion 25 of uprights 11 wherein free length 24 is of necessity lesser or greater in order to space straight portions 25 of uprights 11 at a proper distance from a support structure such as a door. In these alternate embodiments, terminal ends 20 are, of course, preferably cut parallel to straight portion 25 of uprights 11. Though uprights 11 may be formed from a single section of tubing wherein an end 16 is formed on each end of straight portion 25, uprights 11 are most preferably formed as two individual pieces wherein one end 16 is formed on one end of straight portion 25 and two straight portions 25 with bends 21 are then joined together at the free ends 28 thereof. Free ends 28 of straight portions 25 may be identical wherein a sleeve is inserted into each free end 28 and bolts are passed through straight portions 25 adjacent free ends 28, through the sleeve and nuts added to the bolts thus joining both straight portions 25 together, this method conventional in the art and need not be otherwise described here. It is also possible though, to have one free end 28 of one straight portion 25 swaged to a size to fit within an unswaged free end 28 of another straight portion 25 wherein bolts are passed through at straight portions 25 adjacent the unswaged free end 28 of the one straight portion, through the swaged free end 28 of the second straight portion 25, protruding from the unswaged free end 28 whereupon a nut is supplied to the bolt to retain the free ends 28 together. It is also possible to pass a sheet metal screw through at least a portion of the unswaged free end 28 of one straight portion 25 and into the swaged free end 28 of the other straight portion 25, either of these methods well known in the art and not further described. Additionally, it is possible to apply a plate to an external surface of straight portions 25 overlapping free ends 28 of both straight portions wherein the plate may be affixed to the overlapping free ends 28 by any suitable means such as with welds, bolts/nuts or sheet metal screws.

Referring back to FIGS. 1 and 2, uprights 11 are provided with a plurality of sets 26 of apertures 27 in straight portion 25 fully through straight portions 25, apertures 27 adapted to receive shelf supports 13 therein. Apertures 27 in sets 26 are spaced apart approximately 1.25 inches and are approximately 0.25 inch in diameter. Preferably, twelve sets 26 of apertures 27 are disposed along the full length of straight portions 25 between ends 16 thus providing for multiple locations for shelves 14. Since an overall length of uprights 11 is about three feet and straight portions 25 are about 30 inches in length, a spacing between sets 26 of apertures 27 is about 2 and ¾ inches. As was hereinbefore mentioned, a shelf 14 may thus be supported on shelf support 13 preferably disposed into any set 26 of apertures 27 of one upright 11 and on shelf support 13 disposed into a set 26 of apertures 27 in another upright 11 such that edges 52, 53 of shelf 14 are generally parallel to a top edge of a door upon which over door rack 10 is hung though edges 52, 53 are not necessarily on the same horizontal plane. Apertures 27 may be provided through an outer wall of straight portions 25 by means known in the art of tubing manufacture and as such may be punched, drilled, cast, or combinations thereof.

Though sets 26 of apertures 27 are preferred in order to provide for greater stability for shelf supports 13 it should be understood that single apertures 27 may be provided through or into straight portions 25 and a single fastening means comprising a shelf support 13 be inserted thereinto without departing from the scope of this invention. For instance, an eye bolt 30 may be used as shelf support 13, eye bolt 30 having the eye 31 thereof bent at an angle relative to the shank portion 32, shank portion 32 then disposed a through single aperture 27 in one upright 11, as shown at the right side of the top shelf 14 in FIG. 1, wherein the other end of the shelf 14 may likewise be supported or may otherwise be supported with the preferred shelf support 13 detailed elsewhere in this specification. Providing more sets 26 of apertures 27 is certainly within the scope of this invention, and in fact, it is within the scope of this invention to provide apertures 27 all along the full length of straight portions 25 even extending into bends 21 of ends 16. Providing more apertures 27 through uprights 11, of course, may lower the overall strength of uprights 11.

Figure 2:
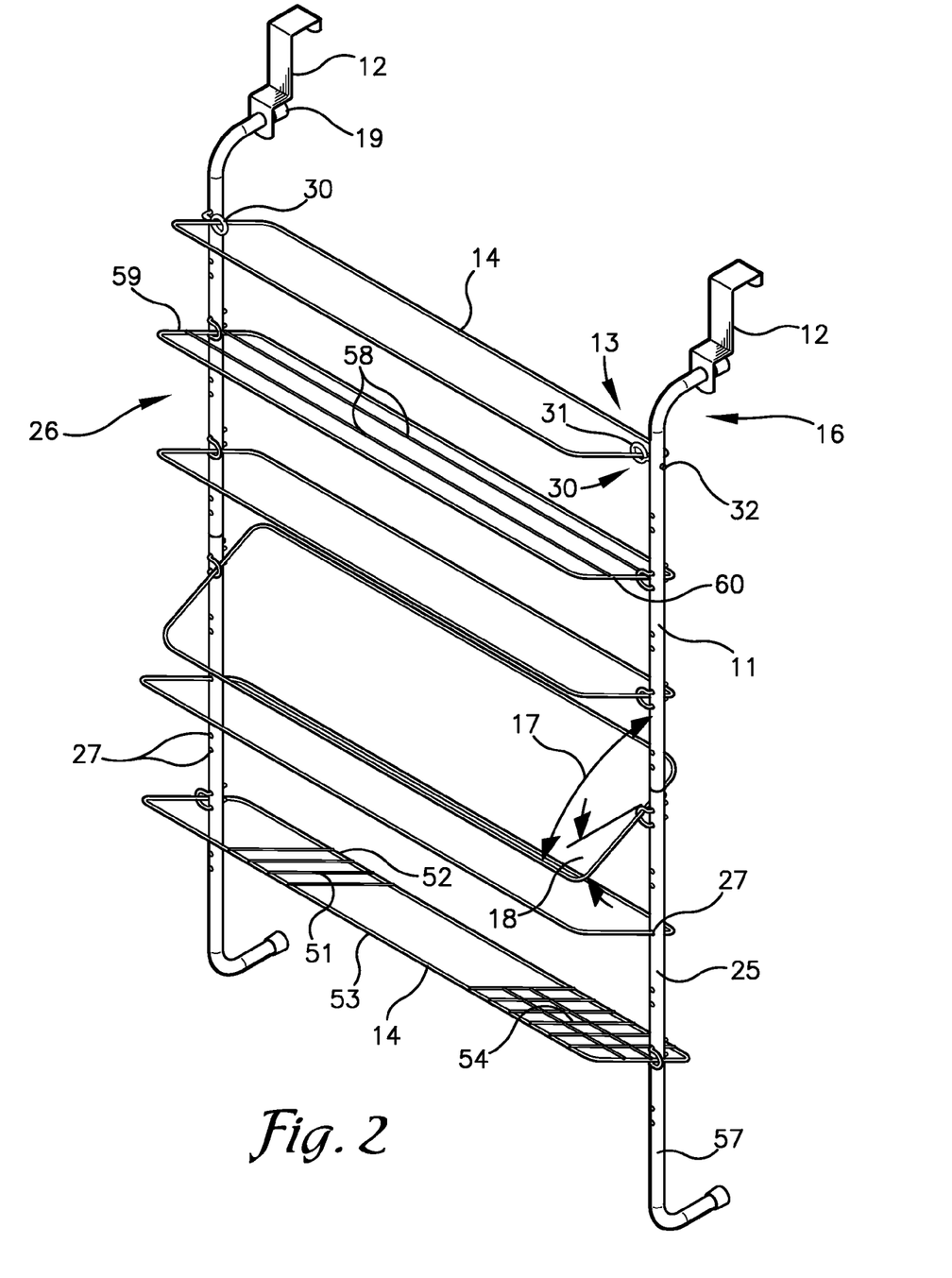
FIG. 2 is a perspective view of the reconfigurable over door rack in FIG. 1 showing the shelves in a forward downwardly facing attitude.

Additionally, though apertures 27 are shown as being passed through straight portions 25 parallel to ends 16 of uprights 11, it should be understood that apertures 27 may be passed through straight portions 25 at an angle relative to ends 16 as shown on one end of the top shelf 14 of FIG. 2. Here, apertures 27 are provided in uprights 11 transverse to the plane of ends 16 wherein a shelf support 13 is supported in a single one of apertures 27 of one upright 11 and an opposed end of a shelf 14 supported on another shelf support 13 disposed into a single one of apertures 27 in another upright 11. Though shelf support 13 is depicted as an eye bolt 30, it is fully understood that shelf support 13 may be of any suitable configuration that will allow a shelf 14 to be pivotable within shelf supports 13. In fact, shelf supports 13 may be similar to the shelf support 13 shown best in FIG. 3, though the "U" shaped shelf support loop 29 would not have the additional bend 33 and would thus be disposed directly into a pair of apertures 27. In yet another embodiment, shelf support 13 may be disposed into apertures 27 in upright 11 from an outside peripheral edge 57 of upright 11 and thus shelf 14 would actually surround uprights 11 as shown at the bottom shelf 14 of FIG. 2. Furthermore, shelf 14 could be disposed directly through apertures 27 in uprights 11 as shown at the second shelf 14 from the bottom of FIG. 2 wherein apertures 27 would be sufficiently large to permit shelf 14 to pivot through an angle of 45 to 150 degrees from a vertical position of uprights 11. Though these last two embodiments are more difficult to assemble and/or more costly to package and ship, the embodiments are fully contemplated in this invention. Though the reader hereof may assume that all shelves 14 are at the same angle 17 relative to the uprights 11 and are also all fixed to uprights 11 with the same style of shelf support 13, it is within the scope of this invention to mount shelves 14 to uprights 11 by any of a combination of the means described above.

Figure 3:
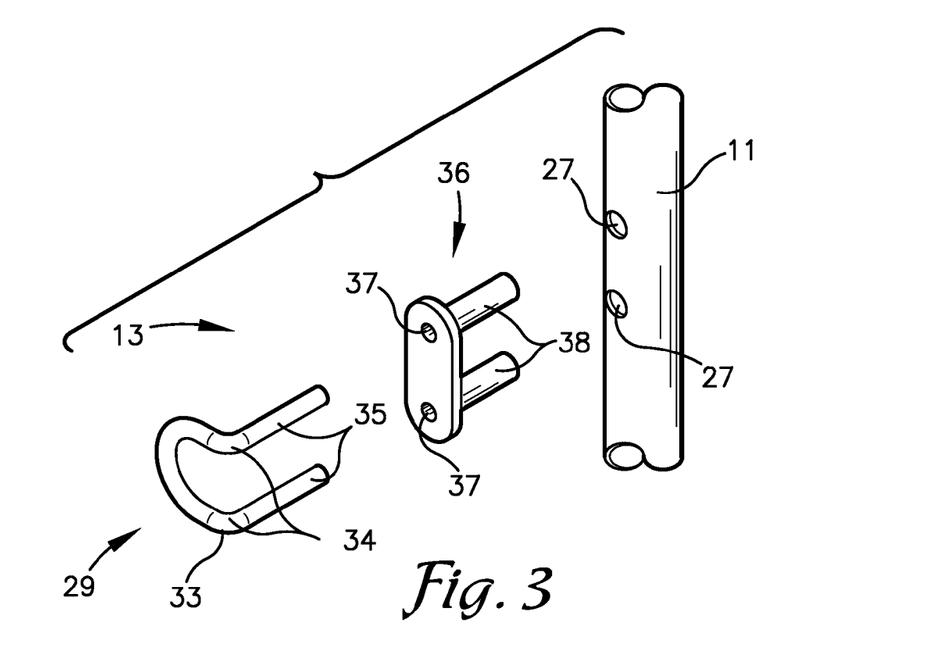
FIG. 3 is an enlarged view of the shelf retainers of the reconfigurable over door rack of FIGS. 1 and 2.

Turning now to FIG. 3, shelf supports 13 are preferably a "U" shaped bent rod disposed into an polymeric retainer 36, shelf support loop 29 provided with protruding legs 35 and a bend 34 between each leg 35 and shelf support loop 29. Bend 34 is preferably about 90 degrees and normal to the plane of shelf support loop 29. Thus, protruding legs 35 are adapted to align with apertures 27 in uprights 11 while shelf support loop 29 protrudes beyond the outer periphery of uprights 11. As hereinbefore explained, shelf support loop 29 preferably extends inwardly of uprights 11, however it has been noted that shelf support loop 29 may extend outwardly of uprights 11 for capturing shelf 14 externally of uprights 11. Preferably, legs 35 of shelf support 13 are inserted into a polymeric retainer 36 wherein polymeric retainer 36 is pressed through apertures 27 thus capturing legs 35 of shelf support 13 in uprights 11. Polymeric retainer 36 may be selected from the materials consisting of polytetrafluoroethylene, polypropylene, polyethylene, HDPE, LDPE, polyamide, polyparabenzamide, silicone, viton, chloroprene, ethylene propylene polymer, isoprene, butyl, polystyrene, a thermoplastic elastomer such as a fluoroelastomer, silicone, urethane, halogenated polymer or combinations thereof but most preferably is HDPE. Polymeric retainer 36 has its protrusions 38 first inserted into apertures 27 and thereafter legs 35 are inserted into preformed holes 37 in polymeric retainer 36, preformed holes 37 extending through protrusions 38. As legs 35 are inserted into preformed holes 37, the polymeric material of protrusions 38 of polymeric retainer 36 that lies within the inner periphery of upright 11 expands slightly thereby rigidly retaining legs 35 of shelf support 13 in upright 11. Though shelf support loop 29 may be removed from polymeric retainer 36 with some difficulty, polymeric retainer 36 is permanently affixed to upright 11 as protrusions 38 are expanded within upright 11 and the jagged portions of apertures 27 within upright 11 bite into protrusions 38, the jagged portions of apertures 27 created when apertures 27 are formed into uprights 11.

Hanging brackets 12 are well known in the art and generally comprise a strap having an upper portion 39 sized to fit over the top edge of a door. Upper portion 39 has two substantially right angle bends 56 spaced apart a distance equal to, or slightly greater than the width of the door. Since most interior doors are 1⅜ inches thick, upper portion 39 has at least 1⅜ space between the right angle bends 56. Although steel is the preferred material for hanging brackets 12, it is fully understood that polymeric materials, brass, wood, fiberglass, copper, aluminum or combinations thereof may be used for hanging brackets 12. Hanging brackets 12 are also preferably provided with two additional right angle bends 55 on lower portion 40 opposite upper portion 39 wherein a straight portion 41 in lower portion 40 beyond the last right angle bend 55 is provided with an aperture 42 therethrough. Aperture 42 is preferably just slightly greater than the outside dimension of end 16 of uprights 11 such that hanging brackets 12 may be placed upon all ends 16 at assembly of over door rack 10 whereafter end caps 19 are placed over ends 16. Though aperture 42 is preferably the same shape as end 16 of each upright 11, aperture 42 may also be a keyhole type shape as will be hereinafter described with respect to a hanging link 43, hanging link 43 adapted to join together one over door rack 10 of this invention to another over door rack 10 to provide for greater storage capacity.

Figure 6:
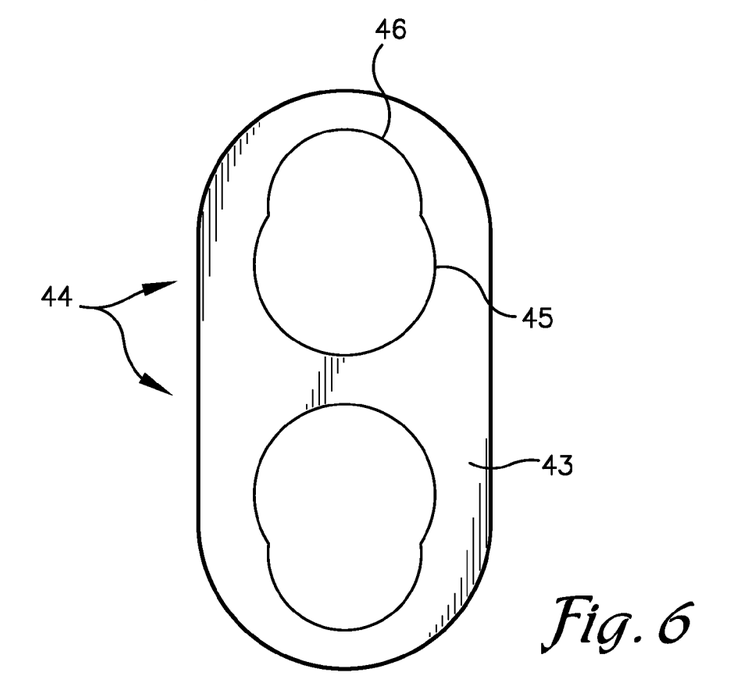
FIG. 6 is a frontal plan view of a hanging link to join an over door rack of FIG. 1 or 2 to another over door rack of FIGS. 1 and 2.

Hanging link 43 is preferably a flat sheet of metal provided with two keyhole type apertures 44 therethrough, hanging link 43 detailed in FIG. 6. Keyhole apertures 44 are formed by providing a first hole 45 approximately the same size as end 16 of uprights 11 though first hole 45 is preferably slightly larger than end 16 to allow for ease of assembly. A second hole 46 is then formed through hanging link 43, second hole 46 overlapping first hole 45 wherein second hole 46 is smaller in size than end 16 such that second hole 46 is captured in reduced size 23 created where bend 21 is formed in end 16. Since hanging link 43 has two sets of holes 45, 46 disposed in opposed relationship, reduced size 23 of a lower end 16 of a superior hanging over door rack 10 is captured in one second hole 46 while an upper end 16 of subsequent over door rack 10 is captured in the other second hole 46 in hanging link 43. Since reduced size 23 of both over door racks 10 is captured in the respective second holes 46 in hanging link 43, both over door racks 10 are fixed in relationship to the door upon which both over door racks 10 are hung. Thus, the second function of reduced size 23 of bend 21 in end 16 has been fully described.

Figures 7, 8:
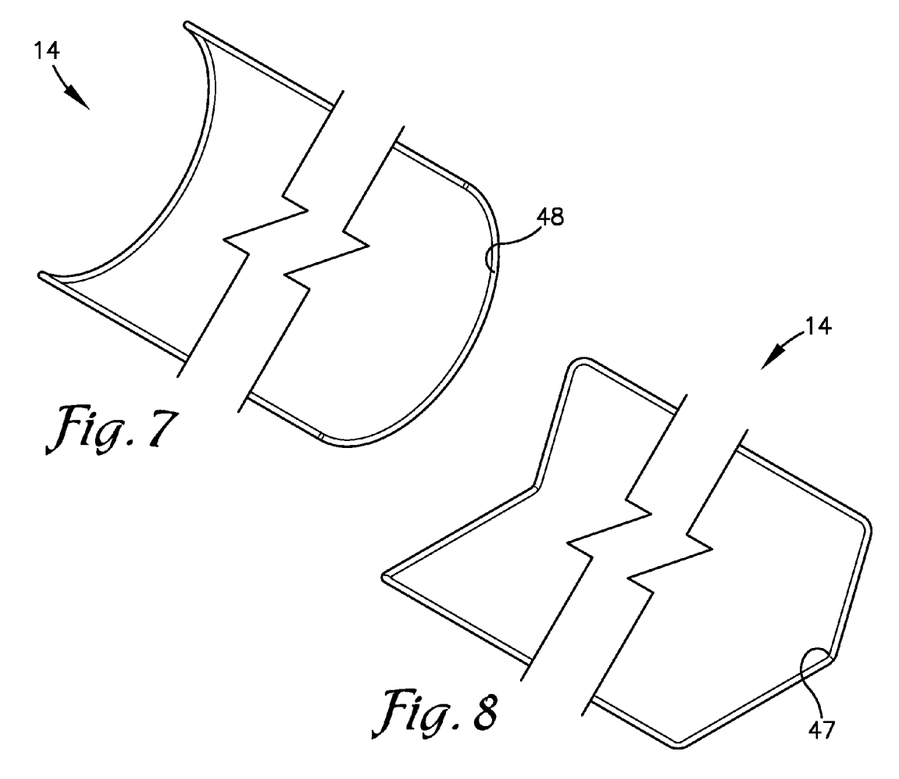
FIG. 7 is a partial perspective view of an alternate shelf design of the reconfigurable over door rack of FIGS. 1 and 2.
FIG. 8 is a partial perspective view of another alternate shelf design of the reconfigurable over door rack of FIGS. 1 and 2.
Figure 9:
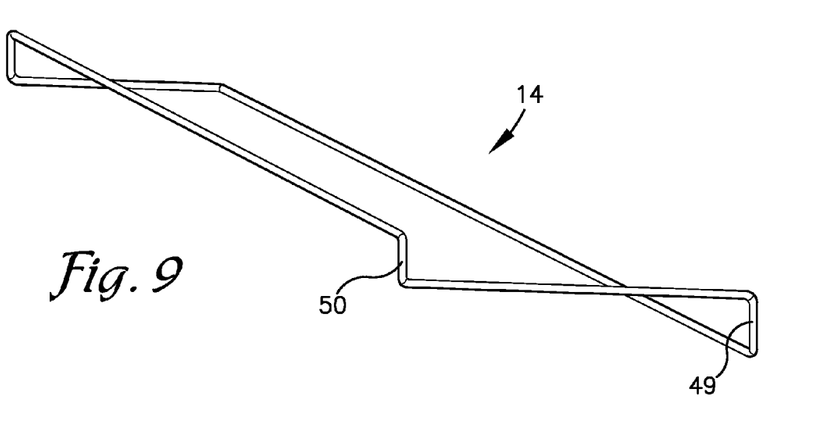
FIG. 9 is a partial perspective view of third alternate shelf design of the reconfigurable over door rack of FIGS. 1 and 2.

Jointly considering FIGS. 7-9, shelves 14 may be formed in a variety of shapes without departing from the scope of this invention and the different shelves 14 depicted in FIGS. 7-9 do not limit the scope of this invention. Referring first to FIG. 7, shelf 14 may be provided with a curved end 48 wherein curved end 48 may be concave downwardly as shown in FIG. 7, however, it is fully understood that shelf 14 of FIG. 7 may be convex upwardly without departing from the scope of this invention. Shelf 14 of FIG. 7 is otherwise formed and assembled in the same manner as shelf 14 of the preferred embodiment. Referring now to FIG. 8, shelf 14 may be provided with a bent end 47 wherein bent end 47 may be downwardly formed as shown in FIG. 8, however, it is fully understood that bend 47 of shelf 14 of FIG. 8 may be upwardly disposed without departing from the scope of this invention. Again, shelf 14 of FIG. 8 is otherwise formed and assembled in the same manner as shelf 14 of the preferred embodiment. Referring now to FIG. 9, shelf 14 may be provided with a downwardly turned face 49 and/or an upwardly turned face 50 without departing from the scope of this invention. Shelf 14 of FIG. 9 is also otherwise formed and assembled in the same manner as shelf 14 of the preferred embodiment. Finally, referring back to FIG. 2, shelf 14 may also be provided with cross wires 51 affixed to edges 52, 53 of shelf 14 over at least a portion of length 15 of shelf 14 as shown in the last shelf 14 in FIG. 2. Shelf 14 may also be provided with longitudinal wires 58 spanning from one end 59 of shelf 14 to the opposite end 60 over at least a portion of shelf 14 as shown on the second shelf 14 of FIG. 2. It is also within the scope of this invention to provide for crosshatching 54 over at least a portion of length 15 of shelf 14 as also shown on the right side of the last shelf 14 in FIG. 2.

Figure 10:
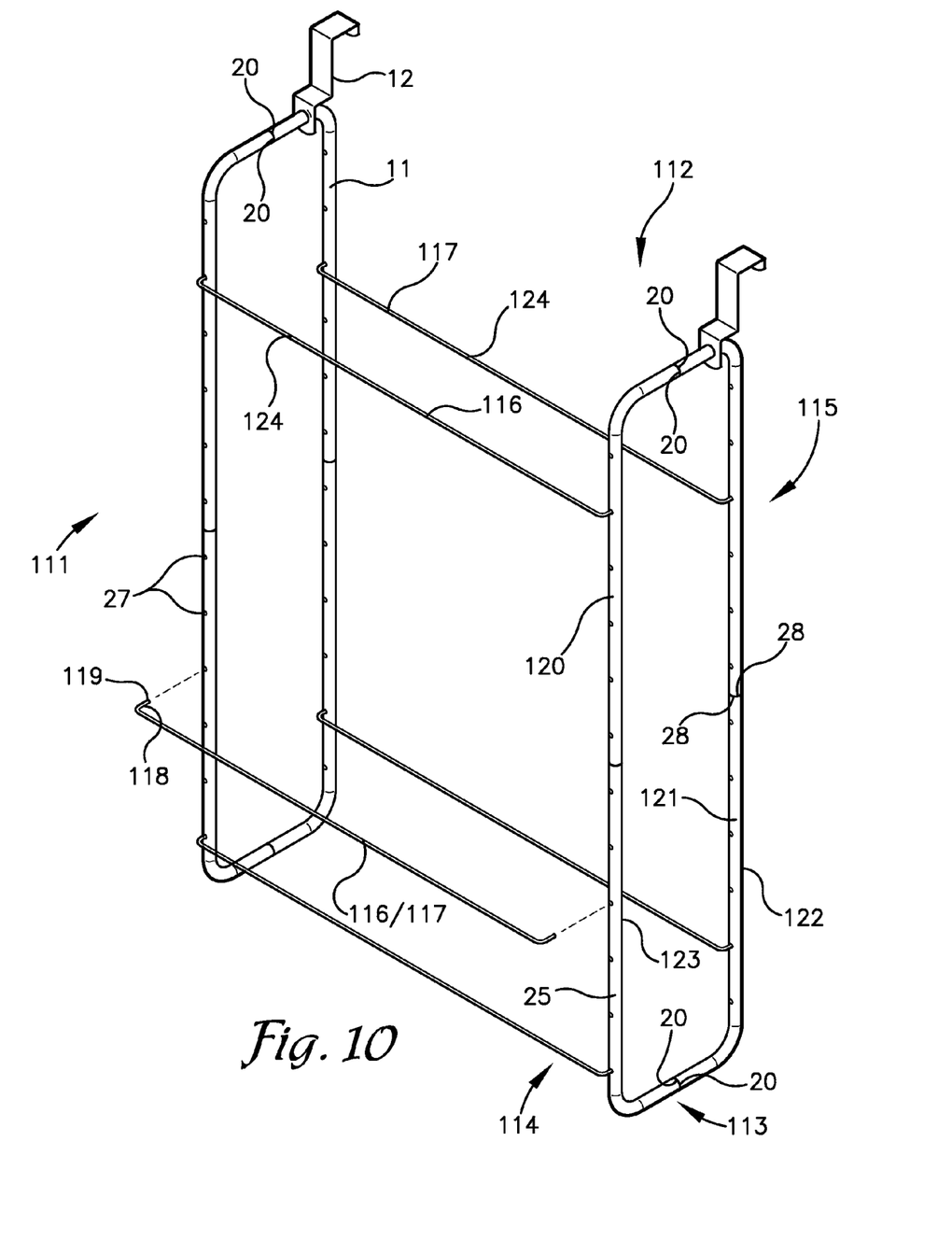
FIG. 10 is a perspective view of an alternate reconfigurable over door rack of this invention showing some shelves in a forward upwardly facing attitude and some shelves in a forward downwardly facing attitude.

Though shelves 14 may be disposed in shelf supports 13 or directly through apertures 27 in uprights 11, uprights 11 may also be made in four pieces and formed into rectangular frames 111 as shown in FIG. 10 with individual wire segments 116, 117 comprising shelves 14. Uprights 11 in FIG. 10 are in pairs 114, 115 and oppositely facing to produce rectangular frames 111, rectangular frames 111 provided with apertures 27 through the outer peripheral wall 25 thereof. Rectangular frames 111 comprises four upright segments 11 wherein free ends 28 of two upright segments 11 are joined together to provide for a front pair 114, terminal ends 28 of two other upright segments 11 are joined together to provide for a rear pair 115 and wherein rear pair 115 is joined to front pair 114 at terminal ends 20 thereof both along a bottom 112 and top 113 of rectangular frame 111 respectively. In FIG. 10, shelves 14 are formed with separate wire segments 116, 117 disposed separately into apertures 27 in front pair 114 and rear pair 115 respectively wherein segments 116, 117 may be identical and wherein segments 116, 117 have short length right angle turned ends 118 with terminal ends 119, however it is fully understood that ends 118 may be longer to dispose a supporting portion 124 of wire segment a distance from upright segments 11. Terminal ends 119 are adapted to be inserted directly into apertures 27 however, polymeric retainers 36 may also be used wherein terminal ends 119 are inserted into holes 37 previously molded into polymeric retainers 36, polymeric retainers 36 previously inserted into apertures 27 as hereinbefore described thus effectively wedge locking ends 118 of wire shelf segments 116, 117 to rectangular frames 111. It should be understood, however, that polymeric retainers 36 for shelving segments 116, 117 would comprise only one protrusion 38 and one hole 37, polymeric retainer 36 thus sized for a single terminal end 119. Shelving segments 116 and 117 may be disposed through apertures 27 from a front edge 120 of front pair 114 and through apertures 27 disposed into an inside edge 121 of rear pair 115 as shown in FIG. 10, however it is to be fully understood that shelving segments 116, 117 may alternately be disposed into apertures 27 from an outside rear edge 122 of rear pair 115 or into an inside edge 123 of front pair 114 or other combinations thereof without departing from the scope of this invention. It is generally understood that apertures 27 pass through upright segments 11 of rectangular frames 111 from front edge 120 to inside edge 123 of front pair 114 and from inside edge 121 to rear edge 122 of rear pair 115. Terminal ends 119 of shelving segments 116, 117 may be inserted into any of apertures 27 in rear pair 115 and any of apertures 27 of front pair 114 thus providing for multiple angles for shelves 14 either forward upward, forward downward or flat as desired by the user.

Figure 11:
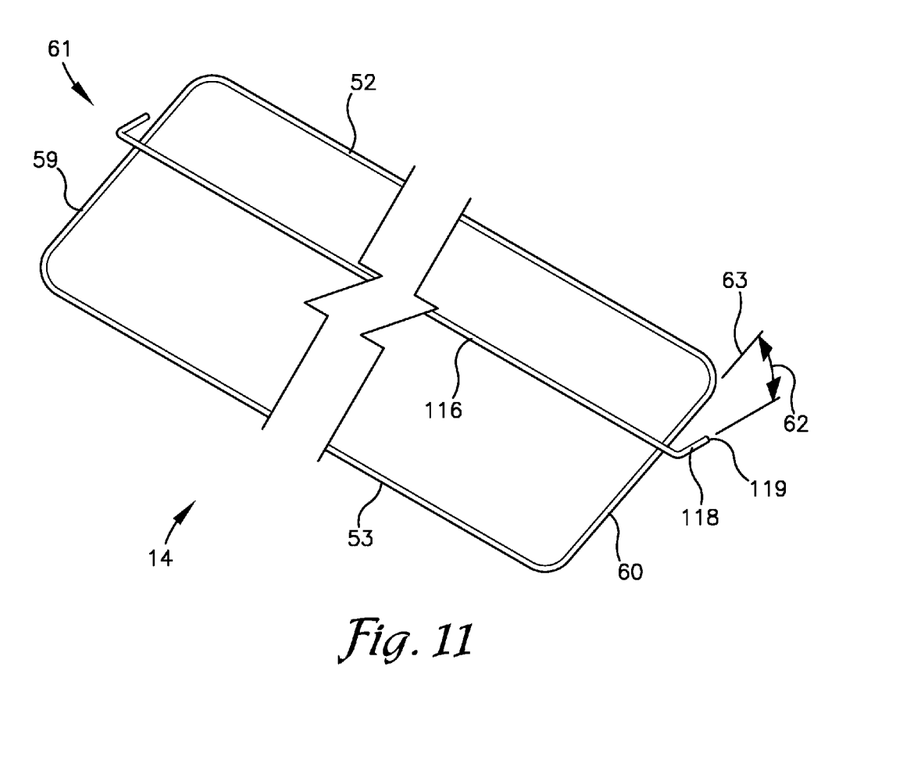
FIG. 11 is a perspective view of a shelf for the reconfigurable over door racks of FIGS. 1 and 2.

Likewise, shelf 14 may be suspended in one aperture 27 in one upright 11 and one aperture 27 in the another upright 11 at any position along straight portions 25 of uprights 11. Referring now to FIG. 11, shelf 14 may be constructed in the shape of any of shelves 14 in FIGS. 1, 2 and 7-9 however, a shelving segment 116 of FIG. 10 is welded to ends 59, 60 approximately at the mid point 61 thereof, shelving segment 116 disposed at an angle 62 from the plane 63 of shelf 14. Angle 62 is shown as being downwardly disposed relative to plane 63, preferably about 35 degrees and thus would have front edge 53 tilted downwardly at angle 62 of up to 45 degrees when assembled to uprights 11. Since angle 62 is established when welding shelving segment 116 to ends 59, 60, angle 62 may be set at any angle up to 45 degrees from plane 63 thus providing for multiple shelf orientations. In fact, it is contemplated in this invention to provide for replacement shelves at various angles 62 as desired by the consumer. It should be readily apparent that by flipping shelf 14 of FIG. 11 end 59 for end 60 with shelving segment 116 disposed on the underside of shelf 14, angle 62 will thus be disposed in an upward relationship relative to plane 63. Thus, shelf 14 of FIG. 11 may be assembled to uprights 11 such that shelf 14 will have front edge 53 tilted upwardly at angle 62 of up to 45 degrees when in the inverted position just described. Though shelf 14 of FIG. 11 is preferably used with uprights 11 of FIGS. 1 and 2, it should also be understood that shelf 14 may be inserted into apertures 27 in front edge 120 or inside edge 123 of front pair 114 of rectangular frames 111 of FIG. 10 thus providing for greater length of storage space from a rear shelving segment 117 across the length of shelf 14 of FIG. 11.

Shelves 14 of the present invention may be coated with a friction increasing substance or be machine tooled, particulate blasted or scored at manufacture of the wire forming shelves 14 to provide for a frictional surface thereupon.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

I claim:

1. A rack for storing objects on a door comprises at least two uprights, at least two hanging brackets, a plurality of shelf supports, a plurality of shelves, said uprights spaced apart a distance approximately equal to a length of said shelves, said uprights spaced from said door by ends of said uprights angled toward said door wherein said shelves are pivotable upon said shelf supports, said uprights provided with apertures disposed into a peripheral wall thereof, said apertures arranged in pairs along said uprights, said apertures receiving said shelf supports therein, said shelves are rectangular wire loops, said shelf supports receiving a portion of said wire loop of said shelves therein wherein said shelf supports comprise a generally "U" shaped wire loop wherein open ends of said "U" shaped wire loop are disposed through preformed holes in polymeric retainers, said polymeric retainers disposed through adjacent said apertures.

\* \* \* \* \*